Aug. 18, 1959     A. H. JUHLIN ET AL     2,900,043
FILTER

Filed June 18, 1956            2 Sheets-Sheet 2

INVENTORS
Arthur H. Juhlin &
BY Albert L. Macan
ATTORNEY

United States Patent Office 2,900,043
Patented Aug. 18, 1959

2,900,043

FILTER

Arthur H. Juhlin, Chicago, and Albert L. Macan, La Grange, Ill., assignors to General Motors Corporation, Detroit, Mich., a corporation of Delaware Application June 18, 1956, Serial No. 591,994

2 Claims. (Cl. 183—40)

This invention relates generally to filters and more particularly to filters of the centrifugal type. The invention particularly concerns inline centrifugal filters having no rotating parts.

The efficiency of operation of a centrifugal filter which does not have any rotating parts is almost wholly dependent upon a more or less constant air velocity through the filtering elements thereof. Most centrifugal filters of this type, however, do not have a wide enough cubic feet per minute range to efficiently filter air or other media over the wide range of flows encountered in various types of service. This may be appreciated when it is understood that at low air flows the air velocity is not sufficient to impart enough centrifugal action to the air to cause effective separation of oil, moisture, foreign matter, etc., therefrom and at higher than rated air flows, i.e., when the demand for filtered air is great, the pressure drop across the filter becomes excessive causing turbulence which interferes with the filtering action as the air passes through the filter.

The present invention is proposed to maintain the air velocity through the filtering element relatively constant over a wide range of cubic feet per minute, for example from, say 15 c.f.m. to 120 c.f.m. air flow. This has been accomplished as follows: The filter of the present invention comprises two or more filtering stages (in the exemplification of this application there are four stages). The first or No. 1 stage is calibrated for, say, 15 c.f.m. The No. 2 stage may be calibrated for a somewhat higher figure, for example 30 c.f.m. The No. 3 stage may be calibrated for an even higher air flow rate, for example 60 c.f.m., and the 4th stage is calibrated for perhaps 120 c.f.m. Each of the stages of the filter is equipped wtih bypass or pressure-relief means which bypasses the excess to the next succeeding stage whenever the capacity of the preceding stage is exceeded. This bypass feature for each stage permits highly efficient velocities at low rates of air flow (good centrifuging action) and highly efficient velocities at high rates of flow so that good filtering is achieved at all flow rates through the filter.

From the foregoing it will be appreciated that an important object of the present invention is to provide a filter which maintains relatively constant air velocities through its various stages over a wide range of cubic feet per minute air flow through the filter.

A further object of the invention is to provide a filter which comprises a plurality of stages calibrated for different rates of c.f.m. airflow and each having bypass means for passing the excess flow directly on to the next stage when the capacity of that stage is exceeded.

It is a still further object of the invention to provide a superior centrifugal filter whose details of construction more efficiently filter the air or other media directed therethrough.

For a more complete understanding of the invention and the above and other objects thereof reference may be had to the accompanying detailed description and drawings, in which.

Figure 1:
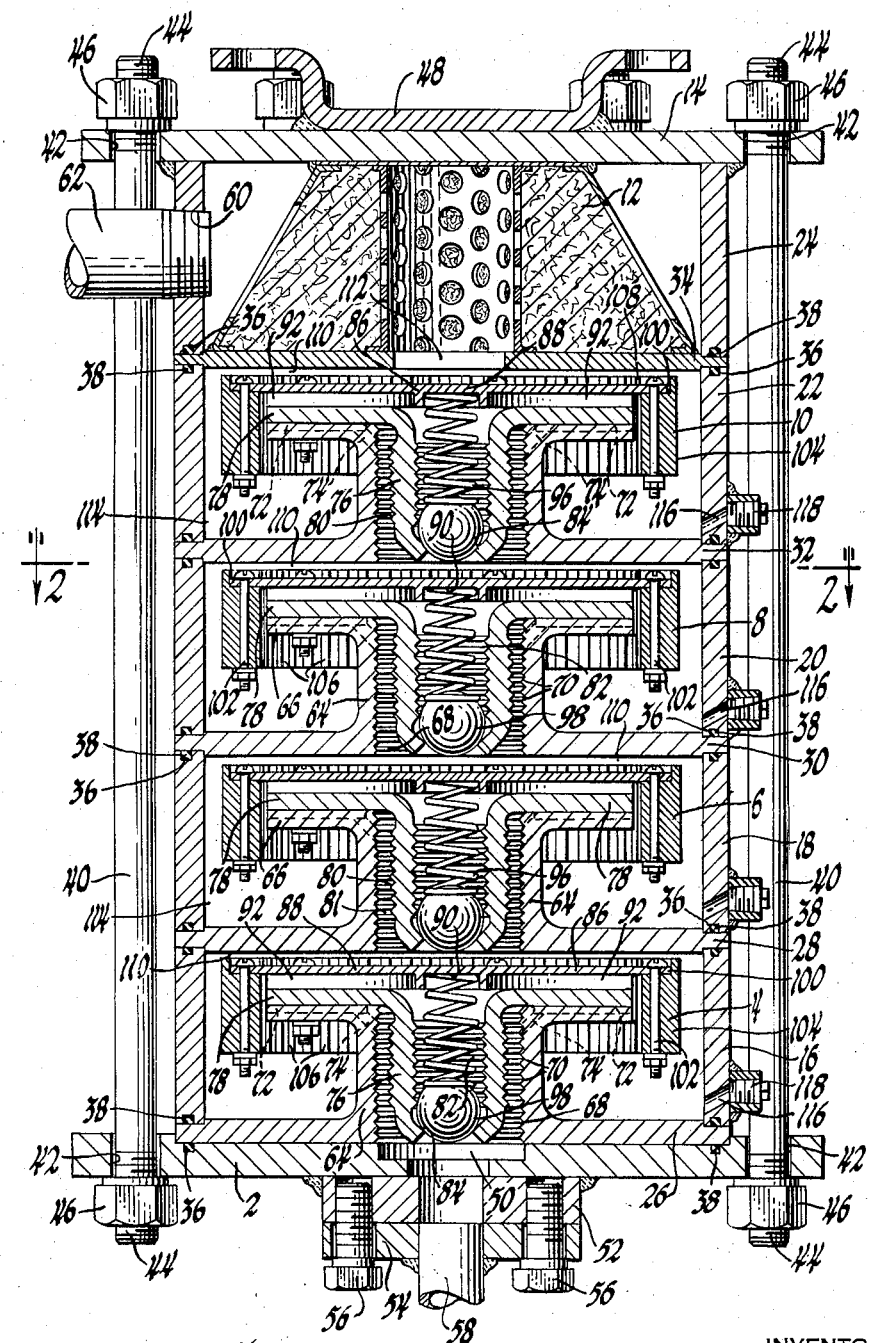
Figure 1 is an elevational view substantially in section of a filter embodying the present invention and shows the filter stages connected in series with each other for achieving the aforementioned relatively constant air velocities through the filter elements at which they are most efficient.

Referring now to the drawings there will be observed a lower plate 2 on which are stacked one on top of the other a plurality of filter elements or stages 4, 6, 8, 10 respectively. Located on the uppermost element or stage 10 is a frustum-shaped filter packing element 12 above which is an upper plate 14. Each of the elements 4, 6, 8, 10 and the frustum 12 is housed or encased in a respective cylindrical section 16, 18, 20, 22 and 24 which are each stacked one on top of the other while clamping between their respective upper and lower edges and the upper and lower plates 2 and 14 flanged portions 26, 28, 30, 32 and 34 of the elements 4, 6, 8, 10 and frustum 12 respectively. As seen, the upper cylindrical section 24 is welded or otherwise permanently secured to the upper plate 14. Its lower edge, however, is provided with a groove 36 in which resides a seal 38 such as an O-ring seal. The upper and lower edges of the cylindrical sections 16, 18, 20 and 22 are provided with similar grooves 36 and seals 38. The whole assembly then is secured together by throughstuds 40 which have threaded ends extending through suitable holes 42 provided in the upper and lower plates 14 and 2. The threaded ends 44 are provided with nuts 46 which may be tightly drawn up to hold the entire assembly rigidly together. The upper plate 14 may have secured thereto a suitable bracket 48 for fastening the filter to a support or the like. The lower plate 2 of the filter is provided with an opening 50 which comprises the inlet of the filter and which has fixed on its lower side a tapped block 52 to which may be secured a cooperating block 54 by means of studs 56, the block 54 acting as a receiving means for the end of a suitable pipe or conductor 58. The upper section 24 of the filter is provided with a suitable threaded opening 60 into which may be screwed the end of a conductor 62 such as piping or the like and the opening 60 represents the outlet of the filter.

Figure 2:
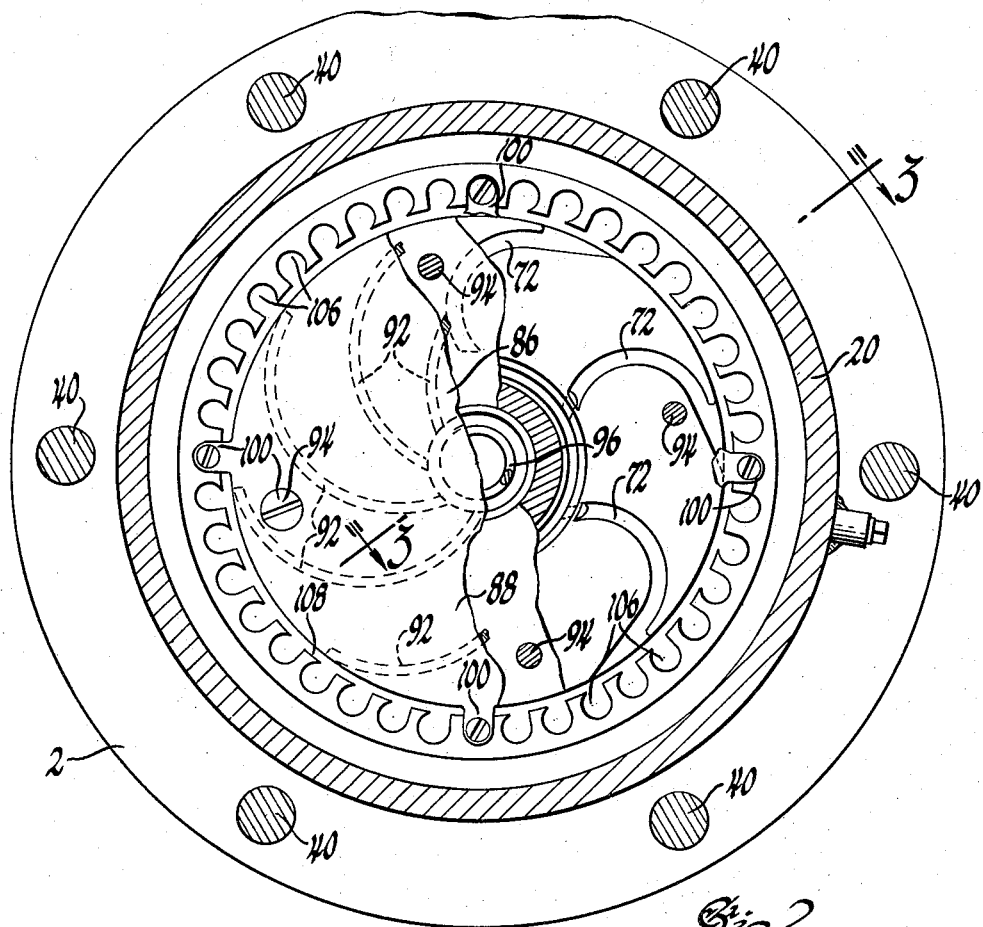
Figure 2 is a view taken substantially on the line 2—2 of Figure 1 with parts broken away and in section illustrating certain details of construction of one of the filter stages.
Figure 3:
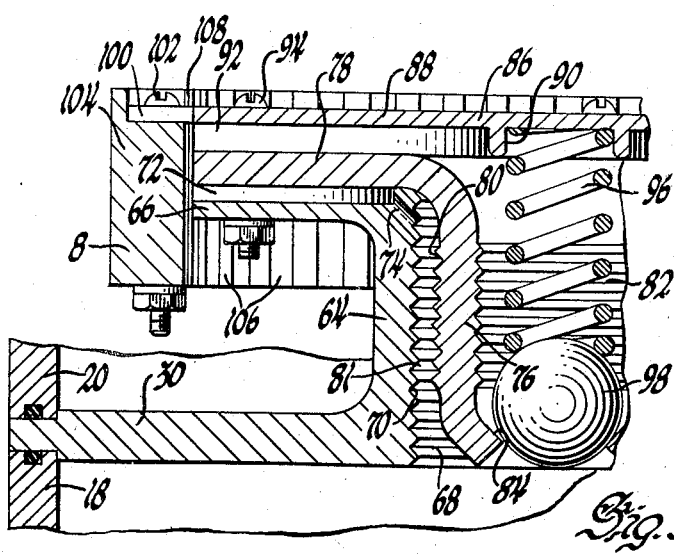
Figure 3 is a fragmentary view with parts in section of a portion of one of the filter stages shown in Figure 1 taken substantially on the line 3—3 of Figure 2 and enlarged to more clearly illustrate certain of the details of the stage and particularly the bypass means for passing the excess air when the capacity of the stage is exceeded directly to the next stage.

Turning now particularly to Figures 2 and 3, one of the filter elements or stages will be described in detail. Since these elements or stages are physically similar in all respects, like numerals will be used to designate like parts. It should be understood, however, that there is one important difference between each of the elements and that is that each has a different capacity. In Figures 2 and 3 it will be seen that each filter element comprises a cylindrical sleeve-like member 64 having an upper flange 66 and a lower flange (in this case flange 30 in view of where section 2 has been taken). The cylindrical member 64 is provided with a bore 68 which is provided with circumferential grooves 70 to form a scrubbing surface tending to scrub the air or other media as it moves through the bore. The flange 66 of the exemplified member 64 is provided with a plurality of circumferentially spaced dispensing grooves 72 forming dispensing paths which give the air a swirling or centrifugal action as it passes therealong. These paths are connected to the bore 68 for communication therewith via small ports or passages 74. Located within the bore 68 is the body portion 76 of a center deflector which has an upper flange 78 which extends over and rests against the flange 66 so as to enclose the grooves 72. The outer wall 80 of the body portion 76 is also grooved so as to form a scrubbing surface which with bore 68 forms an annular passageway 81 leading to ports 74 and the paths 72. The body portion 76 as well as the flange 78 is provided with a bore 82 also having a grooved scrubbing surface. The lower end of the body 76 is necked down or turned inwardly so as to form a ball check seat 84. Seated on the flange 78 thereabove is a deflector 86 which comprises a flat upper plate-like section 88 having a centrally located upper spring seat 90 formed on the bottom side thereof and a plurality of circumferentially spaced curved vanes or deflectors 92 also on the lower side thereof. The deflector 86 and the flanges 78 and 66 are secured together by means of bolt assemblies 94. Located in the bore 82 and normally held against its seat 84 by a spring 96 having an upper end seated in the spring seat 90 is a ball check 98.

It will be observed that the plate-like section 88 of deflector 86 is provided with radially extending tabs or ears 100 which have secured to the underside thereof by means of bolt and nut assemblies 102 a ring-like member 104. Member 104 is provided with a series of circumferentially spaced vertical grooves 106 which are for the purpose of capturing the foreign particles contained in the centrifuged air or other media as they are centrifuged outwardly. It is noted from the drawing that there is an annular clearance 108 between the ring 104 and the outer circumferences of the flanges 66 and 78 in the plate-like section 88 of the deflector 86 which allows any air being emitted by the paths 72 and between the vanes 92 to pass upwardly to the next stage. As already mentioned, it should be appreciated that the capacity of each succeeding filter stage in this case in the upper direction is greater than the capacity of the immediately succeeding stage.

The operation of the filter is as follows: Let it first be assumed that there is a relatively low cubic feet per minute demand for air in the system in which the filter is being used. Under such condition air will enter via the piping 58 and inlet 50 into the first stage 4 of the filter. Since the cubic feet per minute demand of the system has been assumed to be relatively low it will also be assumed that it does not exceed the capacity of the first stage indicated by the numeral 4. In that event the air will pass through the annular passageway 81 and ports 74 to the pathways 72. The air is then directed tangentially by pathways 72 to the ring 104. Due to the centrifugal or swirling action imparted to the air by the pathways 72 as it leaves these pathways the heavier foreign particles in the air are centrifuged to the outside air where they impinge on the surface of the vertical grooves 106. The air then passes upwardly into an open area 110 located immediately below the inlet to the next filter stage 6. This action is repeated for all of the filter stages of the filter until the air passes through a port 112 in plate 34, through the holes and filter packing of the filter packing element 12 and the outlet 60 of the filter. The sediment and foreign matter picked up in the grooves 106 drops into the lower portion 114 of the area 110 where it may be drained off or removed via the ports 116 and plugs 118.

Assuming now that the demand for air in the system exceeds the capacity of the filter element 4 then the increase in flow through the filter will unseat the ball check 98 of element 4 allowing the excess air which would otherwise impair the efficiency of the filtering action of element 4 to pass upwardly through the bore 82, along the vanes or deflectors 92 (which also aid the filtering action by imparting a swirling movement to the air so as to centrifuge foreign matter into the grooves or slots 106) to the annular clearance 108 and directly to the upper area 110 immediately below the inlet to the second filter stage 6. Again, if the capacity of filter stage 6 is exceeded the ball check of filter stage 6 will likewise be unseated and the excess air will pass through the bore 82 of filter stage 6 past the vanes 92 to the annular clearance 108 in the area 110 immediately below the inlet to the filter stage 8. By providing this plurality of filter stages in series with each other and a bypass for each stage which allows the excess air which would otherwise impair the efficiency of that stage to pass directly to a larger capacity filter stage enables the filter to efficiently filter air over wide ranges of cubic feet per minute air flow.

As may have been noted from the foregoing description in conjunction with the drawing the various filter stages of the filter are independent to increase or decrease the air flow range of the filter. This latter feature it will be appreciated even further increases the flexibility of the filter since merely by adding or removing filter stages almost any range of cubic feet per minute flow at which efficient filtering takes place can be achieved.

It is recognized that numerous differences and modifications will occur to those skilled in the art without departing from the spirit or the scope of this invention and it is intended hereby to cover all such changes and modifications.

We claim:

1. A filter assembly comprising an upstanding outer housing having an inlet and an outlet, a pair of upstanding concentric cylindrically shaped members in said housing having juxtaposed flanges on adjacent ends thereof, said concentric members forming an annular scrubbing passageway therebetween, said flanges forming horizontally extending spiral passages therebetween connected by said housing with the outlet thereof and to said passageway, a ring in said housing and around said flanges spaced therefrom and provided with vertical slots facing said flanges for entrapping foreign matter centrifuged by the passage of air through said passage and said passages, the inner of said members having an enlarged passageway therein extending from the inlet of said filter to the outlet thereof via said housing, and a spring-loaded ball check in said enlarged passage normally biased to a seat in said enlarged passage to close off said enlarged passage and responsive to a predetermined demand for flow of air through said filter to provide parallel paths for the flow of air through said filter from the inlet to the outlet thereof.

2. A filter comprising a plurality of upstanding cylindrical housings stacked in series relationship to each other, the lowermost housing having an inlet and the uppermost housing having an outlet, the rest of said housings having an outlet forming the inlet of the housing immediately thereabove, each of said housings having a filter element mounted therein comprising a first hollow cylindrical member having outwardly radially extending flanges on opposite ends thereof, a second cylindrical hollow member concentrically located within said first member and having a flange on an upper end thereof, said members together forming an annular scrubbing passageway and the upper flanges of said members together forming a plurality of spiral passageways communicating with said passageway, an annular ring adjacent the peripheries of said upper flanges having circumferentially spaced upstanding slots facing the ends of the passageways formed by said upper flanges and for the purpose of collecting foreign matter centrifuged thereinto by the swirling action given to the air as it passes through said passageways, and pressure relief means in the second of said members connecting the inlet of the associated housing with the outlet thereof so as to provide upon a predetermined flow demand through said elements parallel paths for the flow of air therethrough from the inlets to the outlets thereof.

References Cited in the file of this patent

UNITED STATES PATENTS

| | | |
|---|---|---|
| 769,713 | Pregardien | Sept. 13, 1904 |
| 1,130,596 | Gerbing | Mar. 2, 1915 |
| 1,864,201 | Kegerreis et al. | June 21, 1932 |
| 2,134,413 | Munoz | Oct. 25, 1938 |

FOREIGN PATENTS

| | | |
|---|---|---|
| 229,996 | Great Britain | Apr. 16, 1925 |
| 433,056 | Germany | Aug. 19, 1926 |
| 141,958 | Australia | July 3, 1951 |